United States Patent [19]
Kunert

[11] 3,780,441
[45] Dec. 25, 1973

[54] METHOD AND DEVICE FOR MEASURING THE CONCENTRICITY OF THE LAMINATED STATOR STACK OF AN ELECTRIC MACHINE

[75] Inventor: Paul Kunert, Erlangen, Germany

[73] Assignee: Siemens Aktiengesellschaft, Munich, Germany

[22] Filed: July 20, 1972

[21] Appl. No.: 273,540

[30] Foreign Application Priority Data
July 24, 1971 Germany................ P 21 37 132.4

[52] U.S. Cl............................. 33/174 Q, 33/DIG. 8
[51] Int. Cl...................... B23f 23/08, B23q 17/04
[58] Field of Search ................. 33/174 Q, 181 AT, 33/203, DIG. 8, 172 D

[56] References Cited
UNITED STATES PATENTS
| | | | |
|---|---|---|---|
| 3,217,418 | 11/1965 | Wennerberg | 33/172 |
| 3,564,721 | 2/1971 | Wilson | 33/174 Q |
| 3,618,219 | 11/1971 | Kelly | 33/174 Q |

Primary Examiner—Leonard D. Christian
Attorney—Hugh A. Chapin et al.

[57] ABSTRACT

A method of testing the concentricity of the stator bore of an electrical machine as the stator lamination layers conjointly defining the bore are stacked is disclosed. Each layer is made up of several lamination sections having respective inside edges at the bore surface. The housing of the machine is centered with respect to the longitudinal axis thereof and is equipped with an end plate and a thrust ring at the excitation side and drive side of the machine respectively. The method includes the steps of arranging markers at equal spacing on a circle described on the end plate so as to be concentric with the longitudinal axis. Markers are also arranged at equal spacing on the thrust ring. The inside edges of the lamination sections are sensed with a sensing and measuring gauge to measure the distance between the inside edge of each lamination section and markers corresponding to the section being sensed. An apparatus for performing the method is also disclosed and includes a sensing and measuring gauge engageable with the markers corresponding to the section sensed to measure the distance between the edge of the section and the markers.

8 Claims, 2 Drawing Figures

3,780,441

METHOD AND DEVICE FOR MEASURING THE CONCENTRICITY OF THE LAMINATED STATOR STACK OF AN ELECTRIC MACHINE

BACKGROUND OF THE INVENTION

The invention relates to a method and apparatus for testing the concentricity of the stator bore of an electrical machine as the stator laminations are stacked to form the stator. The method is especially applicable to a machine of vertical construction such as a machine movable by water power or the like. More specifically, the concentricity is checked by measuring the distance between one of the edges of the individual lamination sections and marks arranged at the housing at a defined distance from the axis of the machine. An apparatus for testing the concentricity of the bore is also disclosed.

The stator lamination stacks of large electrical machines of vertical construction, particularly of machines driven by water power, are usually assembled at the installation site by stacking the individual laminations. It is a known method to locate marks at a defined distance from the axis of the machine rotor on the cylindrical inside surface of the housing, especially on the inside surface of a concrete housing. These marks are distributed over the periphery. In stacking, the distance of the marks from the outer edge of the lamination sections is measured, so that the bore of the stack of laminations remains free on the inside. This technique, however, has the disadvantage that the space between the back of the stack of laminations and the housing must be made so large that it is passable for stacking the laminations. This method has the further disadvantage that the individual marks, or the axially disposed bars that serve as marks, must be adjusted by means of a rotatable arm set up in the center of the machine.

It is an object of the invention to provide a method of testing the concentricity of the stator bore of an electrical machine which obviates the foregoing disadvantages. It is another object of the invention to provide an apparatus for performing the method of the invention.

The method of the invention is especially applicable to an electrical machine of the vertical construction of the type powered by the energy of flowing water. The machine has a longitudinal axis and a housing centered with respect to the axis. An end plate and a thrust ring are provided as part of the housing at the excitation side and drive side of the machine respectively. The machine has a stator made up of stator lamination layers conjointly defining the stator bore and each layer has several lamination sections having respective inside edges at the bore surface.

According to a feature of the method of the invention of testing the concentricity of the stator bore as the stator laminations are stacked, a plurality of first marking means are arranged at equal spacing one from the other on a circle described on the end plate so as to be concentric with the longitudinal axis. Also, a plurality of second marking means are arranged at equal spacing one from the other on the thrust ring. Each of the lamination sections corresponds to at least one of the first marking means and at least one of the second marking means. The inside edges of the lamination sections are then sensed with a sensing and measuring gauge to measure the distance between the inside edge of each lamination section and the marking means corresponding to the section being sensed. The sensing gauge is braced on the first and second marking means corresponding to the lamination being sensed.

As a feature of the invention, the apparatus for testing the concentricity of the bore includes a plurality of first marking means disposed at equal spacing one from the other on a circle described on the end plate so as to be concentric with the longitudinal axis of the machine. A plurality of second marking means is located at equal spacing one from the other on the thrust ring. Each of the lamination sections corresponds to at least one of the first marking means and at least one of said second marking means. A sensing and mesuring gauge means is engageable with the first marking means and the second marking means corresponding to the lamination section under test to brace the gauge means thereon and for sensing the inside edge of the lamination section corresponding thereto to measure the distance between the last-mentioned edge and the corresponding marking means.

According to another feature, the pluralities of the first and second marking means are respective pluralities of bolts engageable with the sensing and measuring gauge means for bracing the same.

According to still another feature of the invention, the sensing and measuring gauge means includes a rod-like member having a longitudinal axis. A sensing and distance measuring device is slideably mounted on the rod-like member for sensing the laminated sections and for measuring the distance between the edge of the section being sensed and the marking arranged on the machine housing that correspond to this section. At least one supporting arm is rigidly attached to each end of the rod-like member and extends therefrom in a direction transverse to axis thereof. Each of the arms has an end portion disposed away from the rod-like member which is engageable with the markers corresponding to the laminated section being sensed.

One of the supporting arms engages the marker on the thrust ring corresponding to the laminated section being sensed. It is advantageous to provide this supporting arm with adjusting means for adjusting the length thereof.

Each of the laminated sections can correspond to two of the markers on the thrust ring and the rod-like member can extend in an upward direction. The gauge means can then further include a mounting plate attached to the lower end of the rod-like member as well as an additional supporting arm pivotally mounted on the mounting plate and extending therefrom to engage one of the two markers corresponding to the laminated section being sensed. The other supporting arm extending to the thrust ring can likewise be pivotally connected to the plate and extend to engage the other one of the two last-mentioned markers. Also provided are locking means for locking the pivoted supporting arms to fix their angular position relative to each other.

Although the invention is illustrated and described herein as a method and apparatus for measuring the concentricity of the laminated stator stack of an electric machine, it is nevertheless not intended to be limited to the details shown, since various modifications may be made therein within the scope and the range of the claims. The invention, however, together with additional objects and advantages will be best understood from the following description and in connection with the accompanying drawings.

DESCRIPTION OF THE PREFERRED EMBODIMENTS

Figure 1:
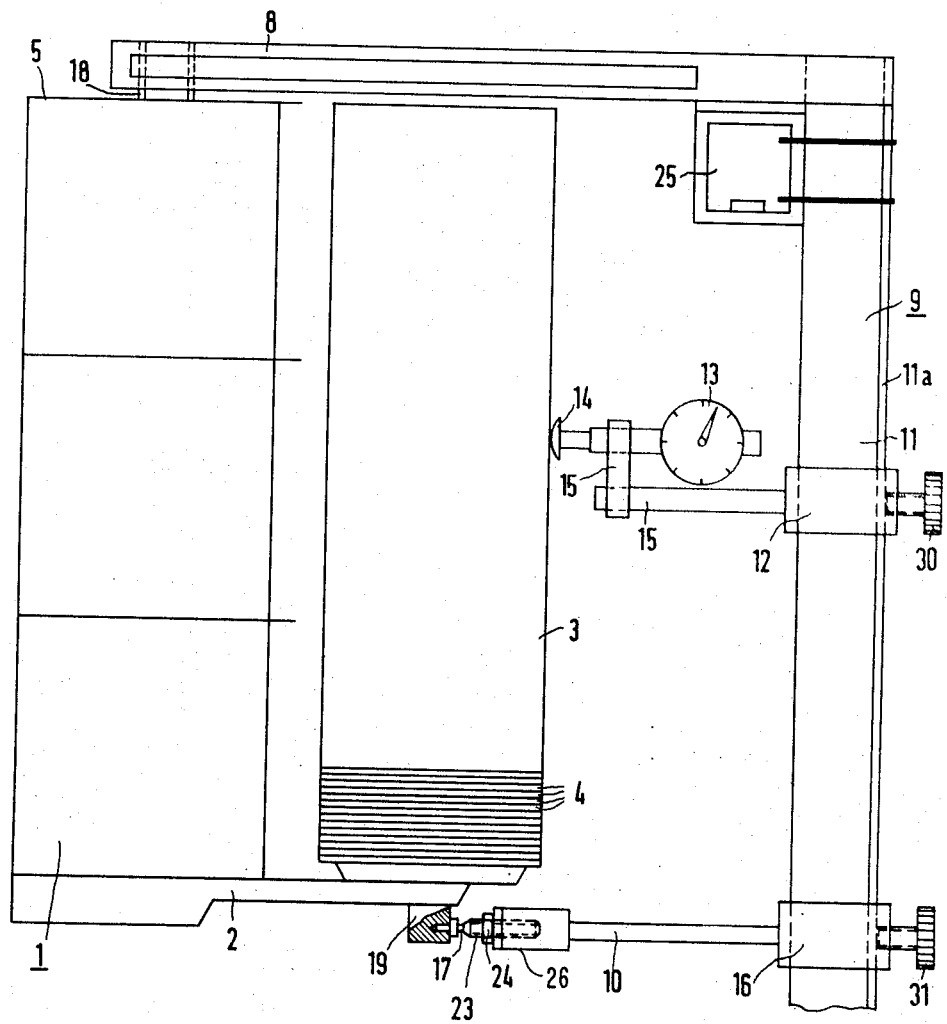
FIG. 1 is an elevation which illustrates the housing of an electrical machine in which stator laminations are being stacked. Also shown are the sensing and distance measuring gauge assembly and marking means on the housing which conjointly constitute the apparatus of the invention for performing the method of the invention.
Figure 2:
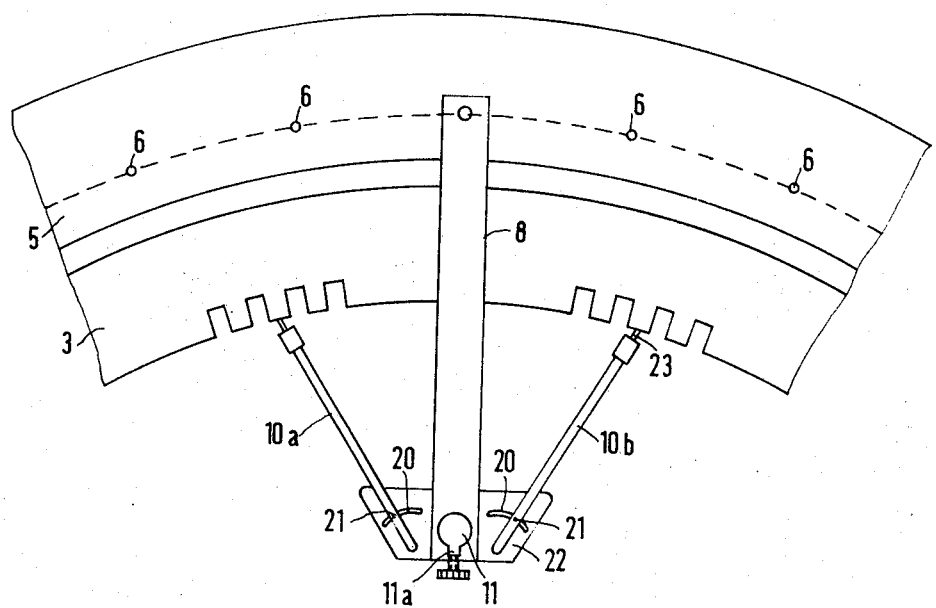
FIG. 2 is a fragmentary plan view of the arrangement according to FIG. 1 wherein the rod-like member of the apparatus of the invention is equipped with a mounting plate for pivotally supporting two supporting arms which are braced at the thrust ring of machine housing.

Referring to FIG. 1, the stator housing 1 of an electrical machine of vertical construction has a thrust ring 2 on the drive side and the laminated stack 3 stacked of lamination sections 4. Referring to FIG. 2, on the front plate 5 on the exciter side of the stator housing, pins 6 are set, for example, by means of a pin setting jig at uniform spacings on a circle described about the axis of the machine. The outrigger arm 8 of a gauge assembly 9 is pivoted on the pins 6. The lower end of gauge assembly 9 is supported at the thrust ring 2 by two additional outriggers 10. The rod-shaped member 11 of the gauge assembly 9 connects the outriggers 8 and 10 and has a cross-section configured so that the holder 12 can be adjusted only in the axial direction. The member 11, for example, can have a rectangular cross-section or a circular cross-section with an axially extending key 11a. The holder 12 is movable on member 11 and can be set thereon at the required height by means of knurled screw 30.

A dial gauge 13 is attached via a linkage 15 to the holder 12 and has a measuring feeler 14 for sensing the inside edge of the individual lamination sections 4. If the measuring feeler 14 touches the inside edge of a lamination section, the dial gauge 13 indicates directly the distance of the inside edge of the lamination section from the circle drawn on the front plate 5. The length of the outrigger arms 10a, 10b is adjustable for setting the vertical alignment of the center member 11 of the gauge assembly; this alignment is achieved with the aid of a spirit level which can be connected with the gauge assembly as a frame level 25, or with aid of two levels fixed in two planes at the center member 11. So that the gauge assembly 9 can be used irrespective of the size of the electrical machine, it is advantageous to connect the outrigger arms 10 with a holder 16 which can be moved axially on the center member 11 and can be locked at the desired height by means of screw 31.

According to FIG. 1, the outrigger arms 10a, 10b supported by pins 17 which are inserted into a flat steel bar 19 that is arranged at the thrust ring 2 after the gauge assembly is aligned. On the pins 17 can be placed sleeves 23, rounded at the end face, and secured by means of a lock nut 24. Therewith, the center member 11 can be fixed in its vertical position in accordance with the pins 6 and the spirit level 25, this fixation being performed in combination with the length of the outrigger arms 10 which has already been adjusted according to the size of the machine. The sleeve 18 is arranged at the free end of the outrigger arm 8 and has an inside diameter which fits the diameter of the pins 6. In a similar manner, the tip of each outrigger arm 10 is equipped with a prism 26 which is supported radially against the pin 17 or in the sleeves 23.

In lieu of the pins 6 and 17, holes can be arranged in the front plate 5 and directly or indirectly at the thrust ring 2. Pins fitting the holes can be provided at the ends of the outrigger arms 8 and 10 respectively.

In order to obtain correct measuring results, it is advisable to use two outrigger arms 10a, 10b (see FIG. 2) which are pivoted at a plate 22 connected with the holder 16 and which can be locked by means of a clamping screw 21 guided in elongated holes 20. Adjustability of the length of the outrigger arm or arms 10 is achieved, for example, by providing the sleeve 23 in the form of a threaded bolt threadably engaging the free end of the outrigger arm, the position of the bolt being secured by a lock nut 24.

As with the pins 6, the pins 17 can also be arranged at uniform mutual spacings on a circle drawn on or at the lower thrust ring 2. The alignment of the gauge is thereby simplified. The number of reference pins 6 and 17 depends on the number of lamination sections required per layer of the laminated stator stack.

What is claimed is:

1. Method of testing the concentricity of the stator bore of an electrical machine as the stator lamination layers conjointly defining the bore are stacked, each layer being made up of several lamination sections having respective inside edges at the bore surface, the machine being of vertical construction such as the type powered by the energy of flowing water or the like and having a longitudinal axis as well as a housing centered with respect to the axis, the housing having an end plate and a thrust ring at the excitation side and drive side of the machine respectively, the method comprising the steps of arranging a plurality of first marking means at equal spacing one from the other on a circle described on the end plate so as to be concentric with the longitudinal axis, arranging a plurality of second marking means at equal spacing one from the other on the thrust ring, each of the lamination sections corresponding to at least one of the first marking means and at least one of the second marking means, and sensing the inside edges of the lamination sections with a sensing and measuring gauge to measure the distance between the inside edge of each lamination section and the marking means corresponding to the section being sensed, the sensing gauge being braced on the first and second marking means corresponding to the lamination section being sensed.

2. The method of claim 1 wherein the pluralities of first and second marking means are respective pluralities of bolts engageable with the sensing and measuring gauge for bracing the same.

3. Apparatus for testing the concentricity of the stator bore of an electrical machine as the stator lamination layers conjointly defining the bore are stacked, each layer being made up of several lamination sections having respective inside edges at the bore surface, the machine being of vertical construction such as the type powered by the energy of flowing water or the like and having a longitudinal axis as well as a housing centered with respect to the axis, the housing having an end plate and a thrust ring at the excitation side and drive side of the machine respectively, the apparatus comprising a plurality of first marking means at equal spacing one from the other on a circle described on the end plate so as to be concentric with the longitudinal axis, a plurality of second marking means at equal spacing one from the other on the thrust ring, each of said lamination sections corresponding to at least one of said first marking means and at least one of said second marking means, and sensing and measuring gauge means engageable with said one first marking means and said one second marking means to brace said gauge means thereon and for sensing the inside edge of the lamination section corresponding thereto to measure the distance between the last-mentioned edge and said corresponding marking means.

4. The apparatus of claim 3, said pluralities of said first and second marking means being respective pluralities of bolts engageable with said sensing and measuring gauge means for bracing the same.

5. The apparatus of claim 3, said sensing and measuring gauge means comprising a rod-like member having a longitudinal axis, a sensing and distance measuring device slideably mounted on said rod-like member for sensing the laminated section and for measuring said distance, and at least one supporting arm rigidly attached to each end of said rod-like member and extending therefrom in a direction transverse to said axis thereof, each of said arms having an end portion disposed away from said rod-like member, said end portions being engageable with said marking means corresponding to the laminated section being sensed.

6. The apparatus of claim 5, one of said supporting arms engaging said one second marking means corresponding to the laminated section being sensed, said one supporting arm having adjusting means for adjusting the length thereof.

7. The apparatus of claim 6, wherein each of the laminated sections corresponds to two of said second marking means on the thrust ring, said rod-Like member extending in an upward direction, and said gauge means comprising a mounting plate attached to the lower end of said rod-like member, an additional supporting arm pivotally mounted on said plate and extending therefrom to engage one of said two marking means, said one supporting arm being likewise pivotally connected to said plate and extending to engage the other one of said two second marking means, and locking means for locking said pivoted supporting arms to fix their angular position relative to each other.

8. The apparatus of claim 7, comprising spirit level means mounted on said gauge means for indicating the position thereof.

* * * * *